Oct. 3, 1944.  C. J. T. YOUNG  2,359,457
HIGHWAY SIGN
Filed Sept. 11, 1942

Clinton J. T. Young
INVENTOR.
BY Donald L. Brown
Attorney

Patented Oct. 3, 1944

2,359,457

UNITED STATES PATENT OFFICE 2,359,457

HIGHWAY SIGN

Clinton J. T. Young, Cambridge, Mass., assignor to Polaroid Corporation, Cambridge, Mass., a corporation of Delaware Application September 11, 1942, Serial No. 458,007

11 Claims. (Cl. 88—65)

This invention relates to higway signs, and more particularly to roadside signs and the like particularly adapted for use in conjunction with a system of automobile headlighting employing polarized light.

It has been proposed to provide all automobiles with headlights emitting polarized light and with suitable polarizing visor means adapted to block the polarized light emitted by the headlights of another automobile approaching from the front. It has also been proposed to combine with such a system additional headlighting means emitting unpolarized light for use in city driving, the polarized beam being designed primarily for highway use or country driving.

It is one object of the present invention to provide signs and the like which may be installed along the roadside for the purpose of instructing the driver of a car as to the proper control of his lights and visor, as for example to tell him to shift from his polarized beam to his unpolarized beam, or vice versa.

Another purpose of the invention is to provide such signs of such characteristics that they are visible to said driver only in the event that he is using the wrong beam for approaching conditions, that is to say, for example, a sign instructing the driver to shift to the polarized beam which will be visible only in unpolarized light, and vice versa.

A further object of the invention is to provide signs of the above type possessing predetermined color characteristics which will serve to convey warning information.

Other objects and advantages will in part be apparent and in part be pointed out in the course of the following description of several embodiments of the invention, which are given as non-limiting examples, in connection with the accompanying drawing, in which.

Figure 1:
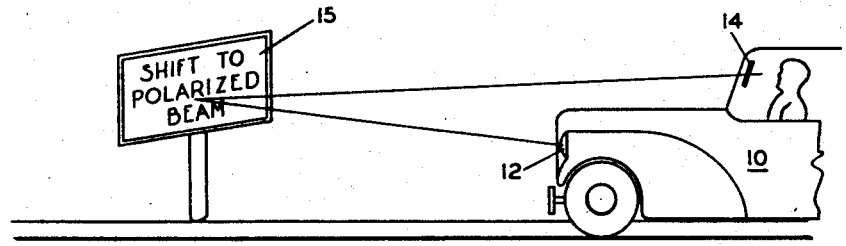
Figure 1 is a diagrammatic view illustrating the operation of an embodiment of the invention.

The principle of the operation of the invention is shown in Fig. 1. Car 10 is assumed to be provided with headlights 12 capable of emitting either polarized or unpolarized light, and is provided with a visor 14 of polarizing material, having its transmission axis parallel to the transmission axis of the polarizing material of headlights 12. Such a system of polarized headlighting is shown, for example, in Patent No. 2,087,795, and it may be assumed for the purpose of this example that the transmission axes of said headlights and analyzer are inclined at 45 degrees to the horizontal. In the scene depicted in Fig. 1, car 10 is assumed to be utilizing its unpolarized beam and to be approaching an area where it should use its polarized beam. A sign 15 is provided at the side of the road bearing thereon any suitable legend, for example, "Shift to polarized beam," and said sign is of such characteristics that said legend will be visible to the driver of car 10 when it is illuminated by unpolarized light from headlights 12, but will be substantially invisible if said headlights are already emitting polarized light.

Figure 2:
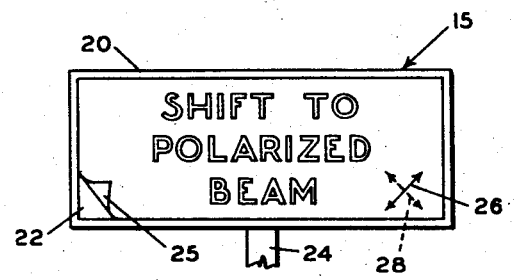
Fig. 2 is a front view showing in detail the construction of the embodiment of the invention appearing in Fig. 1.

A sign having such characteristics may be constructed in several ways, two or more of which are illustrated in Fig. 2. Sign 15 may comprise a sheet 20 of metal or other material having a non-depolarizing reflecting surface 22 and provided with any suitable supporting means 24. Surface 22 may be also preferably somewhat light-diffusing, and a suitable material therefor is aluminum paint or matte aluminum. In one embodiment of the invention, sheet 25 may comprise a sheet of a transparent plastic having the legend "Shift to polarized beam" reproduced thereon in dichroic light-polarizing areas with the transmission axis of said areas parallel to the vibration direction of polarized light emitted from headlights 12, as indicated by arrow 26. It will be seen that when such a sign is illuminated with unpolarized light, the dichroic areas forming the desired legend will appear substantially darker than the remainder of sheet 25 by reason of the light absorbed by the dichroic material therein, and the legend will accordingly appear as dark letters against a light background. However, when the sign is illuminated with polarized light vibrating substantially parallel to arrow 26, all portions of sheet 25 will transmit substantially the same amount of light, with the result that the legend will no longer be readily visible. The converse of this case will operate in similar fashion, that is to say, sheet 25 may be uniformly light-polarizing with the exception of non-polarizing portions defining the desired legend. In this case, when the sign is illuminated with unpolarized light, the legend will be visible by reason of the fact that the letters will be light against the dark background, but when the sign is illuminated with polarized light vibrating parallel to the transmission axis of sheet 25, the entire sheet will appear substantially uniformly light.

In still another form of this embodiment of the invention, the main body of the sign may be black, with the letters constituting the legend formed of dichroic light-polarizing material with the transmission axis thereof crossed with that of the headlights of an approaching car, as is indicated by arrow 28. In this case, when the sign is illuminated with unpolarized light, the legend will appear light against the dark background, but when the sign is illuminated with polarized light it will appear uniformly dark. The converse of this example may also be used, with the background of the sign formed of dichroic light-polarizing material and the letters in black, non-polarizing material. It will be understood that in both of said cases the light-polarizing areas of the sign should be provided with a suitable non-depolarizing reflecting backing.

Signs having the above characteristics may be constructed in several ways. For example, in the first example given above, the letters may comprise material cut from a sheet of light-polarizing material and the entire area of the sign may be provided with a suitable covering layer such as lacquer or any suitable transparent plastic. In the second above example, the letters may be formed by cutting out portions of an otherwise uniformly light-polarizing sheet. Alternatively, sheet 25 may be a single, uniform sheet of a transparent, molecularly oriented organic plastic, such for example as polyvinyl alcohol, and the desired legend may be reproduced thereon by differential staining with a suitable dichroic dye or stain such as a solution of iodine and an iodide. Various other ways of making signs possessing similar characteristics will doubtless be apparent to those skilled in the art, and are to be construed as coming within the scope of the invention.

Figure 3:
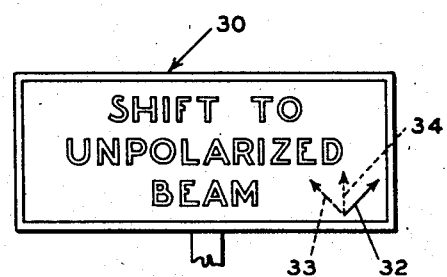
Fig. 3 is a view similar to Fig. 2 showing a modified form of the invention.

Fig. 3 shows another form of the invention which is the counterpart of the device shown in Fig. 2, namely, a sign for the purpose of instructing the driver of a car to shift from his polarized beam to his unpolarized beam. That is to say, sign 30 is of such characteristics that the legend thereon is visible when viewed in predeterminedly polarized light, but is substantially invisible when viewed in unpolarized light. One easy way of forming a sign having such properties is to form the background of the sign in light-polarizing material having the transmission axis thereof parallel to the transmission axis of the headlights of an approaching car, as indicated by arrow 32, and to have the legend formed in light-polarizing material having its transmission crossed with that of the material forming the background, as indicated by arrow 33. In this case the sign will be uniformly transparent when illuminated by unpolarized light, but under polarized light vibrating parallel to arrow 32 the letters will appear dark and the background light. The converse of this case may also be used to render the letters light against a dark background when illuminated by polarized light vibrating parallel to arrow 32, and in both cases a suitable reflecting base should be provided for the polarizing areas as explained above.

Signs of the type last described will also be useful in the case of a driver who has already shifted to his unpolarized beam but has forgotten to remove his analyzer, and such signs may be provided bearing thereon a suitable legend, such for example as "Raise your visor." Such a legend may be reproduced on the sign, for example, by means of letters formed of polarizing material having the axis thereof parallel to arrow 33, with the surrounding areas of the sign formed of polarizing material having its axis parallel to arrow 32. In this case, if the sign is illuminated by unpolarized headlights and the driver of the car is still using an analyzer having its axis parallel to arrow 33, the letters of the sign will appear light against a dark background, owing to the fact that the analyzer will absorb the light polarized by transmission through the background of the sign but will transmit the light polarized by transmission through the letters themselves. The converse of this case will operate in similar fashion.

Still another form of the embodiment of the invention shown in Fig. 3 may be constructed which will be visible only if the driver of the approaching car is using his polarized beam without an analyzer or if he has changed to the unpolarized beam and forgotten to remove his analyzer, but which will be substantially invisible if he is using unpolarized light without an analyzer or polarized light and his analyzer. In this case, for example, the letters of the sign may be formed of quarter-wave retardation material having a principal vibration direction thereof substantially at 45 degrees to the transmission axis of the polarized light from the headlights of an approaching car, and the surrounding area of the sign may comprise polarizing material having its axis crossed with that of said headlights, for example as indicated by arrow 33. The entire base of the sign should, as explained above, comprise a non-depolarizing reflecting and partially diffusing surface. In this case, if an approaching driver is using his polarized lights but no analyzer, light incident on the surrounding area of the sign will be absorbed by the polarizing material, which will accordingly appear black. Light incident on the letters, however, will merely be altered with respect to the polarization characteristics thereof, but will be reflected, and the letters will accordingly appear light.

The same result will take place, but in a different way, if the approaching driver is using unpolarized headlights but still has his analyzer in place. The polarizing material of the sign will polarize the light incident thereon from the headlights to vibrate at right angles to the transmission axis of the analyzer in the car, and said light will accordingly be absorbed by the analyzer, with the result that the surrounding area of the sign will again appear dark. On the other hand, the unpolarized light incident on the letters will remain unpolarized after reflection and a sufficient amount thereof will be transmitted by the analyzer and cause the letters to appear light. The converse of this case can of course also be used, with the polarizing material forming the letters and the quarter-wave material forming the surrounding area of the sign.

If in the above case the driver is using both polarized headlights and analyzer, the sign will appear uniformly dark. The light incident on the polarizing material of the sign will be absorbed thereby. The polarized light incident on the letters will be rotated through 90 degrees by passing twice through the quarter-wave material and will accordingly be reflected against the analyzer within the car in a state of polarization crossed with the transmission axis of the analyzer, and will accordingly be absorbed in the analyzer. The sign will therefore remain substantially invisible. In the event that the driver is using unpolarized light without an analyzer, the sign will be visible by reason of the fact that more light will be absorbed by the polarizing material of the sign than by the areas formed of quarter-wave material. This result, however, may be prevented by darkening those areas formed of quarter-wave material to a point such that their transmission for unpolarized light is substantially equal to that of the polarizing material used. This modification will have no substantial effect on the operation of this embodiment of the invention in the other cases explained above.

Several other forms of the embodiment of the invention shown in Fig. 3 may be constructed without the use of any light-polarizing material. For example, the background of the sign 30 may be provided with a depolarizing surface such as gray paint, and the desired legend may be reproduced thereon by means of non-depolarizing material, such for example as aluminum paint. In this case, when the sign is illuminated by unpolarized light, the legend will be substantially invisible, but when it is illuminated by polarized light and viewed through a suitable analyzer the letters will appear substantially brighter than the background of the sign, owing to the fact that the analyzer will transmit substantially all of the light reflected by the letters, but will absorb a least half of the light reflected by the background of the sign. The converse of this case will also operate in substantially the same fashion, and will cause the letters to appear substantially darker than the background of the sign when illuminated with polarized light and viewed through a parallel analyzer.

In both of the above cases, the effect may be substantially increased by superimposing upon the sign a sheet of quarter-wave retardation material having its principal vibration direction set at 45 degrees to the transmission axis of the headlights and analyzers of approaching cars, as indicated, for example, by arrow 34 in Fig. 3. The result of this arrangement will be that the polarized light reflected by the non-depolarizing areas in the sign will be rotated through 90 degrees by passing twice through the quarter-wave material, and it will therefore be vibrating at right angles to the analyzer of an approaching car and will be absorbed thereby. The non-depolarizing areas will therefore appear black and the depolarizing areas comparatively light when viewed in this manner by the driver of an approaching car.

In all of the above cases wherein the legend on the sign is designed to be visible when illuminated by polarized light or viewed through an analyzer, the appearance of the sign may be enhanced by color effects produced by the use of birefringent material in combination with the sign itself. For example, referring to the case described where the sign comprises a suitable arrangement of depolarizing and non-depolarizing areas over which is superimposed a quarter-wave plate, color effects may be produced by using birefringent material of greater retardation than a quarter wave, set at any angle to the transmission axes of the polarizers of the headlights except parallel or perpendicular, especially at the 45 degree angle mentioned. Similar effects may be produced in the case where the sign is made up of polarizing material, either by superimposing suitably arranged birefringent material upon the sign or by placing it between the polarizing material and the reflecting backing. Particularly brilliant color effects may be achieved by the use of two or more layers of birefringent material, each of a different degree of birefringence.

Figure 4:
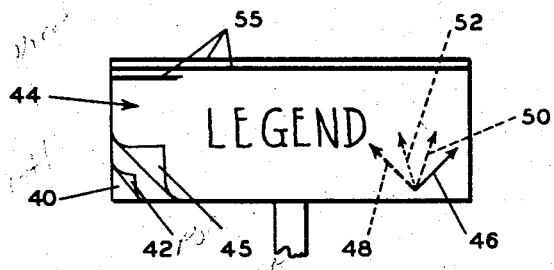
Fig. 4 shows another modified form of the invention.

Another embodiment of the invention wherewith brilliant color effects may be achieved is shown in Fig. 4 and may comprise a base of suitable reflecting material 40, a layer 42 of polarizing material superimposed thereon, and an outer layer comprising letters 44 formed of birefringent material and a surrounding area for the letters formed of different birefringent material 45. Preferably the birefringent material will be of a fairly high degree of retardation, for example, of the order of a full wave. The birefringent material forming the letters of the sign should preferably have the vibrations directions thereof neither parallel nor perpendicular to the transmission axis of the polarizing headlights of an approaching car. The layer of polarizing material may be varied to a considerable degree with respect to the position of its transmission axis, but the most brilliant color effects will be achieved if its axis is parallel or perpendicular to the polarized headlights of an approaching car. For example, if arrow 46 in Fig. 4 represents the vibration direction of polarized light incident on the sign, arrow 48 may represent the transmission axis of polarizing layer 42, and arrows 50 and 52 may represent the positions of the vibration directions of birefringent material 44 and 45, although the invention is in no way limited to this specific example. This type of sign will be equally effective in the case where the approaching driver is using polarized light without an analyzer, unpolarized light with an analyzer, or both polarized light and an analyzer, although in each case different colors will be seen. Many similar arrangements will undoubtedly be apparent to those skilled in the art, and are therefore to be construed as coming within the scope of the invention.

It is to be understood that the present invention is not limited to signs of the above type and for the purposes described. On the contrary, it may be useful in many types of outdoor advertising signs designed for particular effects when illuminated by polarized headlighting. This is particularly true in the case of the above described embodiments of the invention wherein color effects are produced. Any and all such modifications of the invention are therefore to be construed as coming within the scope thereof.

It should be pointed out that polarizing material of the type particularly useful for the purposes of the present invention may be disadvantageously affected by prolonged exposure to outdoor weather conditions, particularly direct sunlight. It may be desirable, therefore, to provide the signs of the invention with some protecting means, such for example as one or more substantially horizontal and parallel louvres acting to shade the face of the sign from the direct rays of the sun, as is indicated at 55 in Fig. 4. Other such protecting means will doubtless be apparent to those skilled in the art and are also to be construed as coming within the scope of the invention.

It is to be understood that the following claims are intended to cover all the generic and specific features of the invention herein described, and all statements of the scope of the invention which, as a matter of language, might be said to fall therebetween.

What is claimed is:

1. In a vehicle headlighting system employing polarized light, means for conveying to the drivers of such vehicles information with respect to the proper control of said polarized light system, said means comprising, in combination, a sign positioned to reflect light from the headlights of an approaching vehicle towards the driver of said vehicle, and a light-polarizing element positioned, with its transmission axis in a predetermined direction, to intercept said light reflected towards said driver, said sign comprising means providing a background area and means providing predetermined indicia, each of said means including light-polarizing elements, the transmission axes of the polarizing elements associated with said background being substantially perpendicular to the transmission axes of the polarizing elements associated with said indicia, said indicia defining information with respect to the proper control of the polarized headlighting system of a vehicle whose headlights illuminate said sign, said indicia being substantially indistinguishable from the background area of said sign if said polarized headlighting system is in proper control but being readily distinguishable from said background area if said polarized headlighting system is in improper control.

2. In a vehicle headlighting system employing polarized light, means for conveying to the drivers of such vehicles information with respect to the proper control of said polarized light system, said means comprising, in combination, a sign positioned to reflect light from the headlights of an approaching vehicle towards the driver of said vehicle, and a light-polarizing element positioned, with its transmission axis in a predetermined direction, to intercept said light reflected towards said driver, said sign comprising means providing a background area and means providing predetermined indicia, each of said means including light-polarizing elements, the transmission axes of the polarizing elements associated with said background being substantially perpendicular to the transmission axes of the polarizing elements associated with said indicia and the transmission axes of the light-polarizing elements included with one of said means being substantially parallel with the transmission axis of said first-mentioned polarizing element, said indicia defining information with respect to the proper control of the polarized headlighting system of a vehicle whose headlights illuminate said sign, said indicia being substantially indistinguishable from the background area of said sign if said polarized headlighting system is in proper control but being readily distinguishable from said background area if said polarized headlighting system is in improper control.

3. In a vehicle headlighting system employing polarized light, means for conveying to the drivers of such vehicles information with respect to the proper control of said polarized light system, said means comprising, in combination, a sign positioned to reflect light from the headlights of an approaching vehicle towards the driver of said vehicle, and a light-polarizing element positioned, with its transmission axis in a predetermined direction, to intercept said light reflected towards said driver, said sign comprising means providing a background area and means providing predetermined indicia, one of said means comprising light-polarizing elements positioned with their transmission axes substantially parallel with the transmission axis of said first-mentioned polarizing element and the other of said means being adapted to reflect diffusedly all plane polarized light incident thereon, said indicia defining information with respect to the proper control of the polarized headlighting system of a vehicle whose headlights illuminate said sign, said indicia being substantially indistinguishable from the background area of said sign if said polarized headlighting system is in proper control but being readily distinguishable from said background area if said polarized headlighting system is in improper control.

4. In a vehicle headlighting system employing polarized light, means for conveying to the drivers of such vehicles information with respect to the proper control of the said polarized light system, said means comprising, in combination, a sign positioned to reflect light from the headlights of an approaching vehicle towards the driver of said vehicle, and a light-polarizing element positioned, with its transmission axis in a predetermined direction, to intercept said light reflected towards said driver, said sign comprising means providing a background area and means providing predetermined indicia, said last-mentioned means comprising light-polarizing elements positioned with their transmission axes substantially perpendicular to the transmission axis of said first-mentioned polarizing element and said background area being substantially black and de-polarizing, said indicia defining information with respect to the proper control of the polarized headlighting system of a vehicle whose headlights illuminate said sign, said indicia being substantially indistinguishable from the background area of said sign if said polarized headlighting system is in proper control but being readily distinguishable from said background area if said polarized headlighting system is in improper control.

5. In a vehicle headlighting system employing polarized light, means for conveying to the drivers of such vehicles information with respect to the proper control of said polarized light system, said means comprising, in combination, a sign positioned to reflect light from the headlights of an approaching vehicle towards the driver of said vehicle, and a light-polarizing element positioned, with its transmission axis in a predetermined direction, to intercept said light reflected towards said driver, said sign comprising means providing a background area and means providing predetermined indicia, one of said means comprising light-polarizing elements positioned with their transmission axes substantially perpendicular to the transmission axis of said first-mentioned polarizing element and the other of said means comprising quarter-wave retardation elements positioned with their axes at substantially 45 degrees to the transmission axis of said first-mentioned polarizing element, said indicia defining information with respect to the proper control of the polarized headlighting system of a vehicle whose headlights illuminate said sign, said indicia being substantially indistinguishable from the background area of said sign if said polarized headlighting system is in proper control but being readily distinguishable from said background area if said polarized headlighting system is in improper control.

6. In a vehicle headlighting system employing polarized light, means for conveying to the drivers of such vehicles information with respect to the proper control of said polarized light system, said means comprising, in combination, a sign positioned to reflect light from the headlights of an approaching vehicle towards the driver of said vehicle, and a light-polarizing element positioned, with its transmission axis in a predetermined direction, to intercept said light reflected towards said driver, said sign comprising means providing a background area and means providing predetermined indicia, one of said means being adapted to depolarize incident plane polarized light and the other said means being adapted to reflect such light without substantial alteration in its polarization characteristics, said indicia defining information with respect to the proper control of the polarized headlighting system of a vehicle whose headlights illuminate said sign, said indicia being substantially indistinguishable from the background area of said sign if said polarized headlighting system is in proper control but being readily distinguishable from said background area if said polarized headlighting system is in improper control.

7. In a vehicle headlighting system employing polarized light, means for conveying to the drivers of such vehicles information with respect to the proper control of said polarized light system, said means comprising, in combination, a sign positioned to reflect light from the headlights of an approaching vehicle towards the driver of said vehicle, and a light-polarizing element positioned, with its transmission axis in a predetermined direction, to intercept said light reflected towards said driver, said sign comprising means providing a background area and means providing predetermined indicia, one of said means being adapted to depolarize incident plane polarized light and the other said means comprising quarter-wave retardation elements positioned to overlie means adapted to reflect without depolarization incident polarized light, said quarter-wave elements being positioned with their axes substantially at 45 degrees to the transmission axis of said first-mentioned polarizing element, said indicia defining information with respect to the proper control of the polarized headlighting system of a vehicle whose headlights illuminate said sign, said indicia being substantially indistinguishable from the background area of said sign if said polarized headlighting system is in proper control but being readily distinguishable from said background area if said polarized headlighting system is in improper control.

8. In a vehicle headlighting system employing polarized light, means for conveying to the drivers of such vehicles information with respect to the proper control of said polarized light system, said means comprising, in combination, a sign positioned to reflect light from the headlights of an approaching vehicle towards the driver of said vehicle, and a light-polarizing element positioned, with its transmission axis in a predetermined direction, to intercept said light reflected towards said driver, said sign comprising means providing a background area and means providing predetermined indicia, said last-mentioned means being adapted to reflect in a predetermined manner plane polarized light incident on said sign and said background-providing means being adapted to reflect in a different predetermined manner the said incident plane polarized light, said indicia defining information with respect to the proper control of the polarized headlighting system of a vehicle whose headlights illuminate said sign, said indicia being substantially indistinguishable from the background area of said sign if said polarized headlighting system is in proper control but being readily distinguishable from said background area if said polarized headlighting system is in improper control.

9. In a vehicle headlighting system employing polarized light, means for conveying to the drivers of such vehicles information with respect to the proper control of said polarized light system, said means comprising, in combination, a sign positioned to reflect light from the headlights of an approaching vehicle towards the driver of said vehicle, and a light-polarizing element positioned, with its transmission axis in a predetermined direction, to intercept said light reflected towards said driver, said sign comprising means providing a background area and means providing predetermined indicia, said last-mentioned means being adapted to reflect in a predetermined manner plane polarized light incident on said sign and said background-providing means being adapted to reflect in a different predetermined manner the said incident plane polarized light, both said indicia-forming means and said background-providing means including birefringent material, said indicia defining information with respect to the proper control of the polarized headlighting system of a vehicle whose headlights illuminate said sign, said indicia being substantially indistinguishable from the background area of said sign if said polarized headlighting system is in proper control but being readily distinguishable from said background area if said polarized headlighting system is in improper control.

10. In a vehicle headlighting system employing polarized light, means for conveying to the drivers of such vehicles information with respect to the proper control of said polarized light system, said means comprising, in combination, a sign positioned to reflect light from the headlights of an approaching vehicle towards the driver of said vehicle, and a light-polarizing element positioned, with its transmission axis in a predetermined direction, to intercept said light reflected towards said driver, said sign comprising means providing a background area and means providing predetermined indicia, said last-mentioned means being adapted to reflect in a predetermined manner plane polarized light incident on said sign and said background-providing means being adapted to reflect in a different predetermined manner the said incident plane polarized light, both said indicia-forming means and said background-providing means including birefringent material overlying light-polarizing material, said indicia defining information with respect to the proper control of the polarized headlighting system of a vehicle whose headlights illuminate said sign, said indicia being substantially indistinguishable from the background area of said sign if said polarized headlighting system is in proper control but being readily distinguishable from said background area if said polarized headlighting system is in improper control.

11. In a vehicle headlighting system employing polarized light, means for conveying to the drivers of such vehicles information with respect to the proper control of said polarized light system, said means comprising, in combination, a sign positioned to reflect light from the headlights of an approaching vehicle towards the driver of said vehicle, and a light-polarizing element positioned, with its transmission axis in a predetermined direction, to intercept said light reflected towards said driver, said sign comprising means providing a background area and means providing predetermined indicia, said last-mentioned means being adapted to reflect in a predetermined manner plane polarized light incident on said sign and said background-providing means being adapted to reflect in a different predetermined manner the said incident plane polarized light, at least one of said means comprising birefringent material, said indicia defining information with respect to the proper control of the polarized headlighting system of a vehicle whose headlights illuminate said sign, said indicia being substantially indistinguishable from the background area of said sign if said polarized headlighting system is in proper control but being readily distinguishable from said background area if said polarized headlighting system is in improper control.

CLINTON J. T. YOUNG.